US010057800B2

(12) United States Patent
Liao et al.

(10) Patent No.: US 10,057,800 B2
(45) Date of Patent: Aug. 21, 2018

(54) APPARATUSES AND METHODS FOR USER EQUIPMENT (UE)-INITIATED CONNECTION AND RESOURCE RELEASE

(71) Applicant: MediaTek Inc., Hsin-Chu (TW)

(72) Inventors: Shih-Chieh Liao, Kaohsiung (TW); Chi-Chen Lee, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 124 days.

(21) Appl. No.: 15/012,083

(22) Filed: Feb. 1, 2016

(65) Prior Publication Data
US 2016/0242191 A1 Aug. 18, 2016

Related U.S. Application Data

(60) Provisional application No. 62/115,736, filed on Feb. 13, 2015.

(51) Int. Cl.
| | | |
|---|---|---|
| *H04W 24/10* | (2009.01) | |
| *H04L 12/26* | (2006.01) | |
| *H04W 76/38* | (2018.01) | |
| *H04W 76/06* | (2009.01) | |
| *H04W 72/00* | (2009.01) | |

(52) U.S. Cl.
CPC ............ *H04W 24/10* (2013.01); *H04L 43/16* (2013.01); *H04W 76/068* (2013.01); *H04W 76/38* (2018.02); *H04W 72/00* (2013.01)

(58) Field of Classification Search
CPC .... H04L 43/16; H04W 24/10; H04W 76/068; H04W 72/00
See application file for complete search history.

(56) References Cited

U.S. PATENT DOCUMENTS

| | | | |
|---|---|---|---|
| 8,995,394 B2 | 3/2015 | Edara et al. | |
| 2013/0045735 A1* | 2/2013 | Kim | H04W 36/0094 455/422.1 |
| 2013/0083726 A1* | 4/2013 | Jain | H04W 28/0215 370/328 |
| 2013/0201834 A1* | 8/2013 | Klingenbrunn | H04W 28/12 370/236 |
| 2013/0303203 A1* | 11/2013 | Wang | H04W 68/00 455/458 |
| 2013/0329637 A1* | 12/2013 | Kodali | H04W 76/046 370/328 |
| 2014/0200001 A1* | 7/2014 | Song | H04W 36/0094 455/436 |

(Continued)

FOREIGN PATENT DOCUMENTS

WO   WO 2014/165657   10/2014

*Primary Examiner* — Benjamin H Elliott, IV
(74) *Attorney, Agent, or Firm* — McClure, Qualey & Rodack, LLP (57) ABSTRACT

A mobile communication device including a wireless transceiver and a controller is provided. The wireless transceiver performs wireless transmission and reception to and from a service network. The controller operates in a connected mode with a connection to the service network, and determines whether there is no active data traffic in a first period of time when operating in the connected mode. In response to there being no active data traffic in the first period of time, the controller performs a local release of the connection or sends a measurement report to trigger the service network to release the connection.

14 Claims, 8 Drawing Sheets

(56) References Cited

U.S. PATENT DOCUMENTS

2015/0365894 A1* 12/2015 Bai ................... H04L 1/1854
                                                                370/311
2016/0242191 A1*  8/2016 Liao .................. H04L 43/16
2016/0302256 A1* 10/2016 Susitaival ........... H04W 76/025

* cited by examiner

APPARATUSES AND METHODS FOR USER EQUIPMENT (UE)-INITIATED CONNECTION AND RESOURCE RELEASE

CROSS REFERENCE TO RELATED APPLICATIONS

This Application claims priority of U.S. Provisional Application No. 62/115,736, filed on Feb. 13, 2015, the entirety of which is incorporated by reference herein.

BACKGROUND OF THE APPLICATION

Field of the Application

The application generally relates to management of connection and resource, and more particularly, to apparatuses and methods for User Equipment (UE)-initiated connection release and resource release.

Description of the Related Art

Due to the growing demand for ubiquitous computing and networking, various cellular technologies have recently been developed, including the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced (LTE-A) technology, etc.

According to release 12 of the 3rd Generation Partnership Project (3GPP) Technical Specification (TS) 36.331, only the Evolved-Universal Terrestrial Radio Access Network (E-UTRAN) can initiate the Radio Resource Control (RRC) connection release procedure which triggers the UE to release the RRC connection, including established radio bearers and all radio resources. That is, the UE can only passively wait for the E-UTRAN to release the RRC connection when the UE is configured to operate in the RRC_CONNECTED mode. Furthermore, according to release 12 of the 3GPP TS 36.413 and 36.418, the E-UTRAN may start a user inactivity timer when detecting that no data traffic associated with the UE is ongoing, and then initiate the RRC connection release procedure when the user inactivity timer expires. However, the value of the user inactivity timer may be too long, causing the UE to stay in the $RRC_{13}$ CONNECTED mode with no data traffic ongoing. This is an unfavorable situation since the UE consumes more power in the RRC_CONNECTED mode. Not to mention that the UE will take up radio resources assigned by the E-UTRAN but not use them, which results in poor utilization of radio resources.

In order to meet the demand for higher data rates in wireless communications, support for wider transmission bandwidths is required, and the so-called Carrier Aggregation (CA) and Dual Connectivity (DC) techniques have been proposed to allow for the expansion of effective bandwidths delivered to a UE. Using the CA technique, more than 2 carriers may be aggregated to form a larger transmission/reception bandwidth. Each of the aggregated frequency channels is generally referred to as a component carrier, which may be taken as a component of the aggregated bandwidth. Using the DC technique, a UE may perform data transceiving simultaneously with two base stations, e.g., a macro base station and a micro base station.

According to release 12 of the 3GPP TS 36.331, the CA or DC functionality may only be configured by the service network. Specifically, the service network configures the UE to perform measurements on Secondary Cell (SCell) frequencies and to report the measurement results. If the measurement results indicate that the signal quality of an SCell is good enough, the service network will configure the UE to add the SCell. Otherwise, if the measurement results indicate that the signal quality of an SCell becomes too bad, the service network will configure the UE to delete the SCell. That is, the UE can only passively wait for the service network to configure the CA or DC functionality. However, there may be situations where the CA or DC functionality is not desired to be configured to the UE, due to the CA or DC functionality consuming more power and causing the operating temperature to rise.

BRIEF SUMMARY OF THE APPLICATION

In a first aspect of the application, a mobile communication device comprising a wireless transceiver and a controller is provided. The wireless transceiver is configured to perform wireless transmission and reception to and from a service network. The controller is configured to operate in a connected mode with a connection to the service network, determine whether there is any active data traffic in a first period of time when operating in the connected mode, and perform a local release of the connection or send a measurement report to trigger the service network to release the connection, in response to there being no active data traffic in the first period of time.

In a second aspect of the application, a method for connection release, which is executed by a mobile communication device, is provided. The method comprises the steps of: operating in a connected mode with a connection to a service network; determining whether there is any active data traffic in a first period of time when operated in the connected mode; and performing a local release of the connection or send a measurement report to trigger the service network to release the connection, in response to there being no active data traffic in the first period of time.

In a third aspect of the application, a mobile communication device comprising a wireless transceiver and a controller is provided. The wireless transceiver is configured to perform wireless transmission and reception to and from a service network. The controller is configured to determine whether a CA or DC functionality has been configured by the service network, in response to the CA or DC functionality being configured by the service network, send a measurement report to trigger the service network to release the configuration of the CA or DC functionality, or release or deactivate the configuration of the CA or DC functionality, and in response to the CA or DC functionality not being configured by the service network, avoid sending another measurement report with a predetermined event type to the service network.

In a fourth aspect of the application, a method for connection release, which is executed by a mobile communication device, is provided. The method comprises the steps of: operating in a connected mode with a connection to a service network; determining whether a CA or DC functionality has been configured by the service network; in response to the CA or DC functionality being configured by the service network, sending a measurement report to trigger the service network to release the configuration of the CA or DC functionality, or releasing or deactivating the configuration of the CA or DC functionality; and in response to the CA or DC functionality not being configured by the service network, avoiding sending another measurement report with a predetermined event type to the service network.

Other aspects and features of the present application will become apparent to those with ordinarily skill in the art upon review of the following descriptions of specific embodiments of the mobile communication devices and the methods for connection and resource release.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The 3GPP specifications are used to teach the spirit of the application, and the application is not limited thereto.

Figure 1:
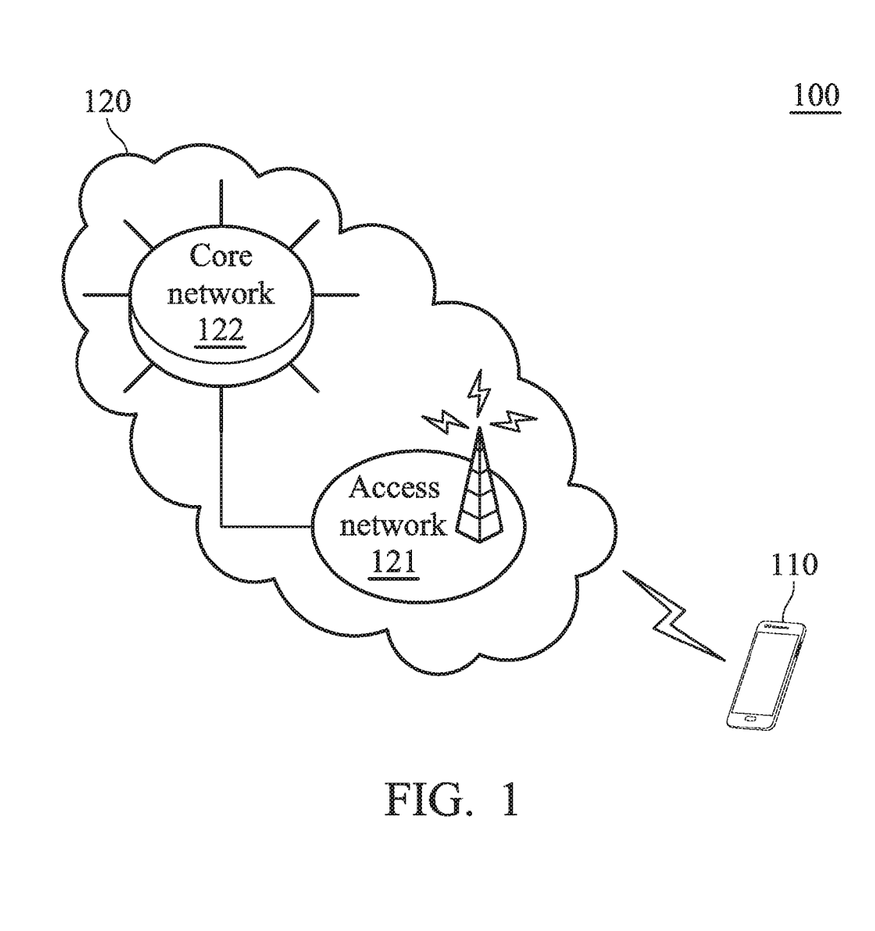
FIG. 1 is a block diagram of a wireless communication environment according to an embodiment of the application.

FIG. 1 is a block diagram of a wireless communication environment according to an embodiment of the application. The wireless communication environment 100 comprises a mobile communication device 110 and a service network 120, wherein the mobile communication device 110 is wirelessly connected to the service network 120 for obtaining mobile services. The mobile communication device 110 may be a feature phone, a smartphone, a panel Personal Computer (PC), a laptop computer, or any computing device supporting the wireless technology utilized by the service network 120. In one embodiment, the mobile communication device 110 may further support the CA and/or DC functionality. The service network 120 may be a cellular network supporting single carrier and single connection, such as an LTE network, or a cellular network supporting multiple component carriers or dual connections, such as an LTE-A network.

Specifically, the service network 120 comprises an access network 121 and a core network 122, wherein the access network 121 is responsible for processing radio signals, terminating radio protocols, and connecting the mobile communication device 110 with the core network 122, while the core network 122 is responsible for performing mobility management, network-side authentication, and interfaces with public/external networks (e.g., the Internet). Each of the access network 121 and the core network 122 may comprise one or more network nodes for carrying out said functions. For example, if the service network 120 is an LTE/LTE-A/TD-LTE network, the access network 121 may be an Evolved-UTRAN (E-UTRAN) which includes at least an evolved NB (eNB) (e.g., a macro eNB, femto eNB, or pico eNB), and the core network 122 may be an Evolved Packet Core (EPC) which includes a Home Subscriber Server (HSS), Mobility Management Entity (MME), Serving Gateway (S-GW), and Packet Data Network Gateway (PDN-GW or P-GW).

Figure 2:
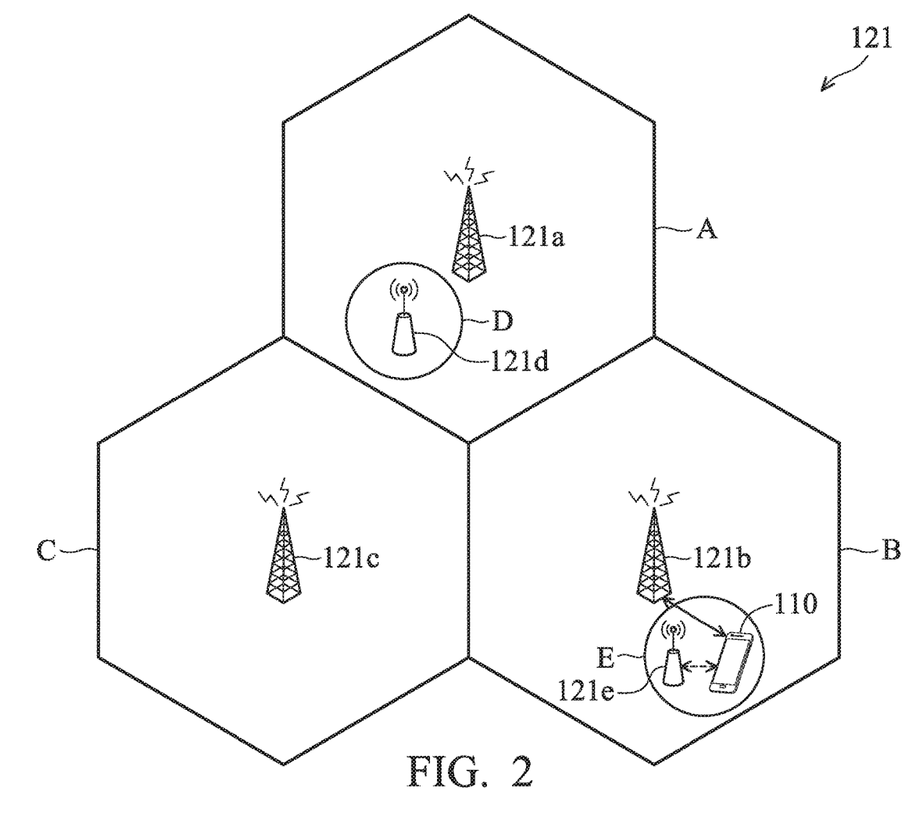
FIG. 2 is a block diagram illustrating the access network 121 according to an embodiment of the application.

FIG. 2 is a block diagram illustrating the access network 121 according to an embodiment of the application. The access network 121 includes a number of eNBs. An eNB may be a station that communicates with User Equipment (UE), e.g., the mobile communication device 110, and may also be referred to as a base station, a cellular station, an access point, or the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

The access network 121 may be a heterogeneous network that includes eNBs of different types, e.g., macro eNBs, pico eNBs, femto eNBs, relays, etc. Accordingly, an eNB may provide communication coverage for a macro cell, a pico cell, a femtocell, a small cell, and/or other types of cell. As shown in FIG. 2, the eNBs 121a, 121b, and 121c are macro eNBs serving macro cells A, B, and C, respectively. The eNB 121d is a femto eNB serving femtocell D. The eNB 121e is a pico eNB serving a pico cell E. An eNB may support one or multiple (e.g., two, three, four, and the like) cells, depending on the number of supported component carriers. A macro cell generally covers a relatively large geographic area (e.g., several kilometers in radius) and may allow unrestricted access by UEs with service subscriptions with the network provider. A pico cell generally covers a relatively smaller geographic area and may allow unrestricted access by UEs with service subscriptions with the network provider. A femtocell generally covers a relatively small geographic area in a residential-type setting (e.g., a home or small business) and, in addition to unrestricted access, may also provide restricted access by UEs having an association with the femtocell (e.g., UEs in a Closed Subscriber Group (CSG), UEs for users in the home, and the like).

The mobile communication device 110 may communicate with one or more eNBs simultaneously. For example, as shown in FIG. 2, the mobile communication device 110 may communicate with the eNB 121b, and optionally with the eNB 121e if both the access network 121 and the mobile communication device 110 support the CA and/or DC functionality.

Figure 3:
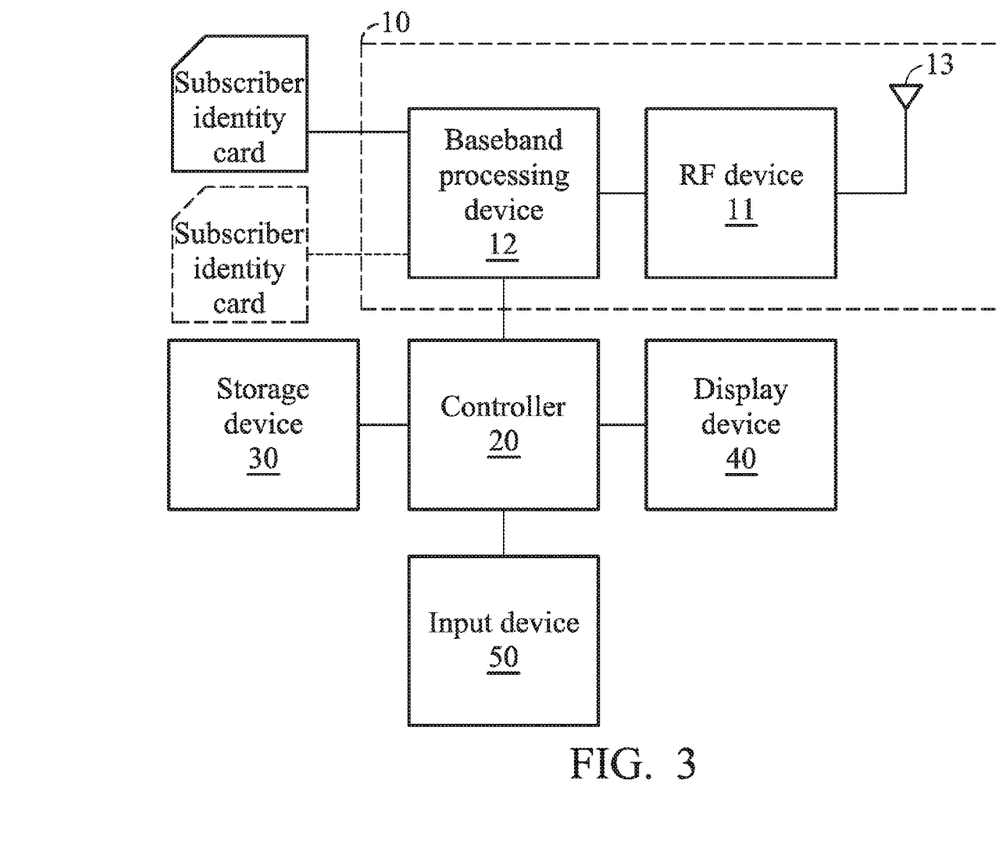
FIG. 3 is a block diagram illustrating the mobile communication device 110 according to an embodiment of the application.

FIG. 3 is a block diagram illustrating the mobile communication device 110 according to an embodiment of the application. The mobile communication device 110 comprises a wireless transceiver 10, a controller 20, a storage device 30, a display device 40, and an input device 50. The wireless transceiver 10 is configured to perform wireless transmission and reception to and from the service networks 120 and 130. The wireless transceiver 10 comprises a Radio Frequency (RF) device 11, a baseband processing device 12, and an antenna 13. The baseband processing device 12 is configured to perform baseband signal processing and control the communications between subscriber identity card(s) (e.g., a Subscriber Identity Module (SIM) card, a Universal SIM (USIM) card, a Removable User Identity Module (R-UIM) card, or a CDMA SIM (CSIM) card) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may also contain multiple hardware devices to perform radio frequency conversion. For example, the RF device 10 may comprise a mixer to multiply the baseband signals with a carrier oscillated in the radio frequency of the supported cellular technologies, wherein the radio frequency may be 900 MHz, 1800 MHz or 1900 MHz utilized in GSM/GPRS/EDGE technology, or may be 900 MHz, 1900 MHz or 2100 MHz utilized in WCDMA technology, or may be 900 MHz, 2100 MHz, or 2.6 GHz utilized in LTE/LTE-A/TD-LTE technology, or another radio frequency, depending on the cellular technology in use.

In another embodiment, if the mobile communication device 110 supports the CA and/or DC functionality, the wireless transceiver 10 may include multiple sets of the RF device 11 and the baseband processing device 12, wherein the antenna 13 may be shared by the multiple RF devices or each RF device may be coupled to a respective antenna.

The controller 20 may be a general-purpose processor, a Micro Control Unit (MCU), an application processor, a Digital Signal Processor (DSP), or the like, for controlling the wireless transceiver 10 for wireless communications with the service networks 120 and 130, storing and retrieving data to and from the storage device 30, sending a series of frame data (e.g. representing text messages, graphics, images, etc.) to the display device 40, receiving signals from the input device 50. In particular, the controller 20 coordinates the aforementioned operations of the wireless transceiver 10, the storage device 30, the display device 40, and the input device 50 for performing the method for cell selection during a call fallback from an advanced network to a legacy network.

In another embodiment, the controller 20 may be incorporated into the baseband processing device 12, serving as a baseband processor.

The storage device 30 may be a memory, such as a FLASH memory or a Non-volatile Random Access Memory (NVRAM), or a magnetic storage device, such as a hard disk or a magnetic tape, or an optical disc, or any combination thereof for storing cell information of legacy networks (e.g., the service network 130) and instructions and/or program code of applications and/or communication protocols.

The display device 40 may be a Liquid-Crystal Display (LCD), Light-Emitting Diode (LED) display, or Electronic Paper Display (EPD), etc., for providing a display function. Alternatively, the display device 30 may further comprise one or more touch sensors disposed thereon or thereunder for sensing touches, contacts, or approximations of objects, such as fingers or styluses.

The input device 50 may comprise one or more buttons, a keyboard, a mouse, a touch pad, a video camera, a microphone, and/or a speaker, etc., serving as the Man-Machine Interface (MIMI) for interaction with users.

It should be understood that the components described in the embodiment of FIG. 3 are for illustrative purposes only and are not intended to limit the scope of the application.

Figure 4:
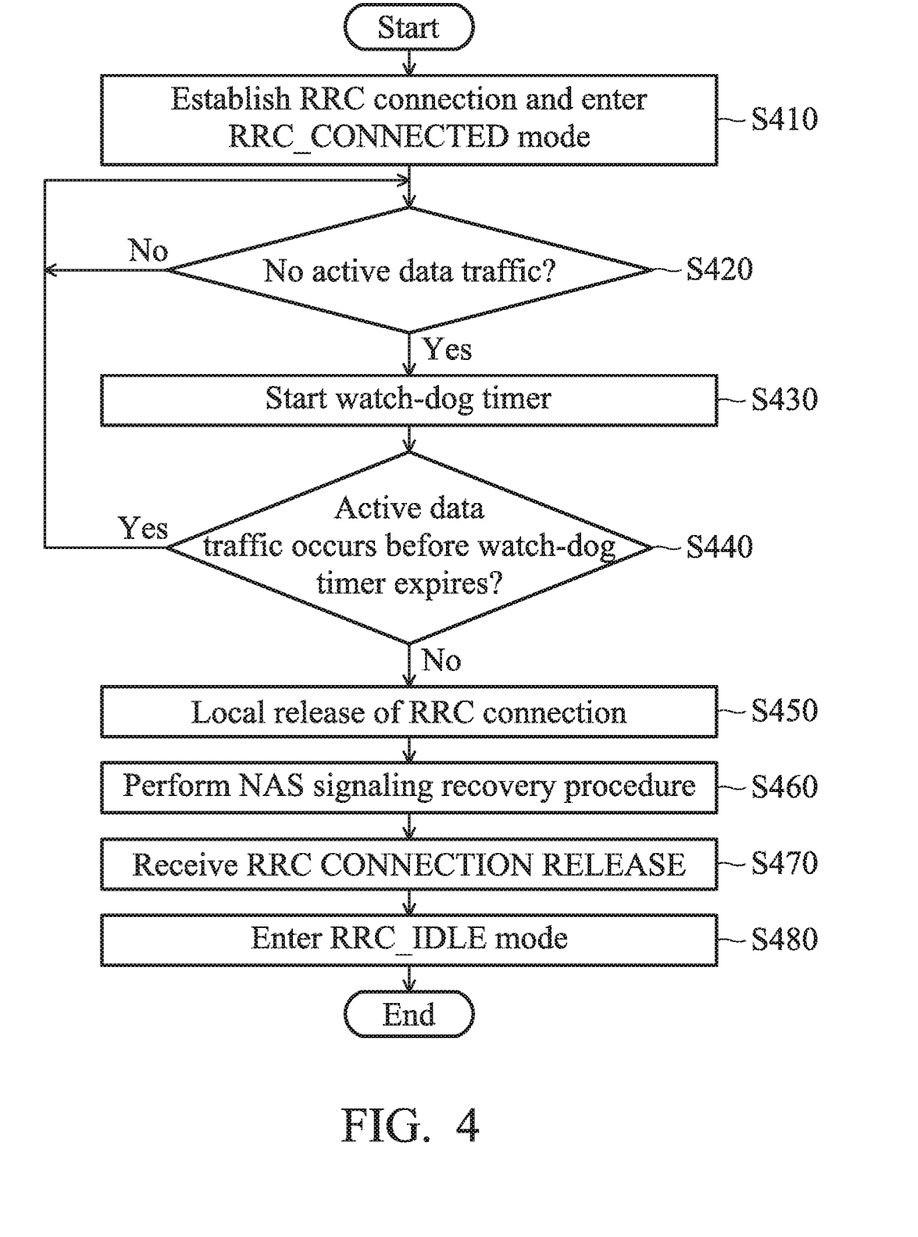
FIG. 4 is a flow chart illustrating the method for connection release according to an embodiment of the application.

FIG. 4 is a flow chart illustrating the method for connection release according to an embodiment of the application. In this embodiment, the method is applied to a mobile communication device, such as the mobile communication device 110. To begin, the mobile communication device is configured by a service network to establish an RRC connection and enter the RRC_CONNECTED mode (step S410). When in the RRC_CONNECTED mode, the mobile communication device keeps monitoring if there is no active data traffic (step S420), and if so, starts a watch-dog timer to count a predetermined period of time (step S430). Otherwise, if there is active data traffic, the method flow returns to step S420.

Next, the mobile communication device determines whether there is active data traffic before the watch-dog timer expires (step S440), and if so, the method flow goes back to step S420. Otherwise, if there is no active data traffic before the watch-dog timer expires, the mobile communication device performs local release of the RRC connection (step S450). Specifically, the mobile communication device releases the RRC connection, and the established radio bearers and all radio resources configured by the service network. Subsequent to step S450, the mobile communication device performs a Non-Access Stratum (NAS) signaling recovery procedure with the service network (step S460). After that, the mobile communication device receives an RRC CONNECTION RELEASE message from the service network (step S470), and then enters the RRC_IDLE mode according to the RRC CONNECTION RELEASE message (step S480), and the method ends.

Specifically, during the NAS signaling recovery procedure, the mobile communication device first establishes an RRC connection with the service network and performs a Tracking Area Update (TAU) procedure in which a TRACKING AREA UPDATE REQUEST message including an active flag set to 0 to indicate "no bearer establishment requested" is sent to the service network. Subsequent to the TAU procedure, the mobile communication device receives an RRC CONNECTION RELEASE message from the service network for releasing the RRC connection. Please note that, detailed descriptions of the NAS signaling recovery procedure, the RRC connection establishment procedure, and the TAU procedure are omitted herein for brevity since it is beyond the scope of the application, and references may be made to release 12 of the 3GPP TS 36.331 and 24.301.

Figure 5A:
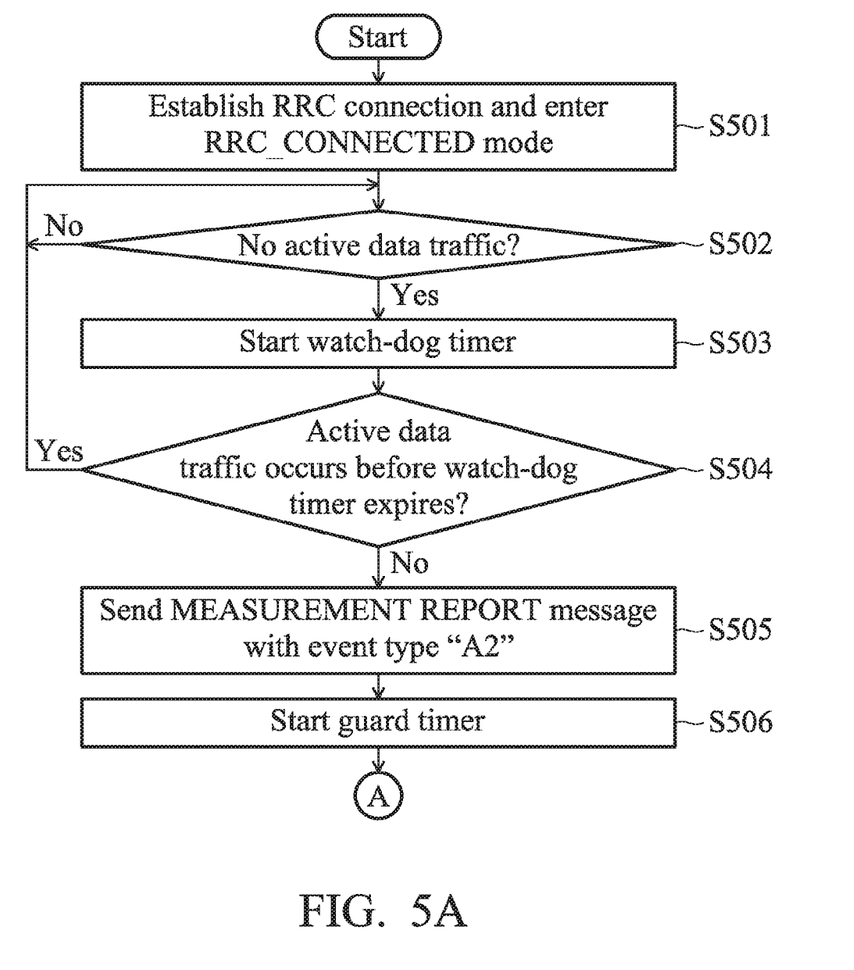
FIGS. 5A and 5B show a flow chart illustrating the method for connection release according to another embodiment of the application.
Figure 5B:
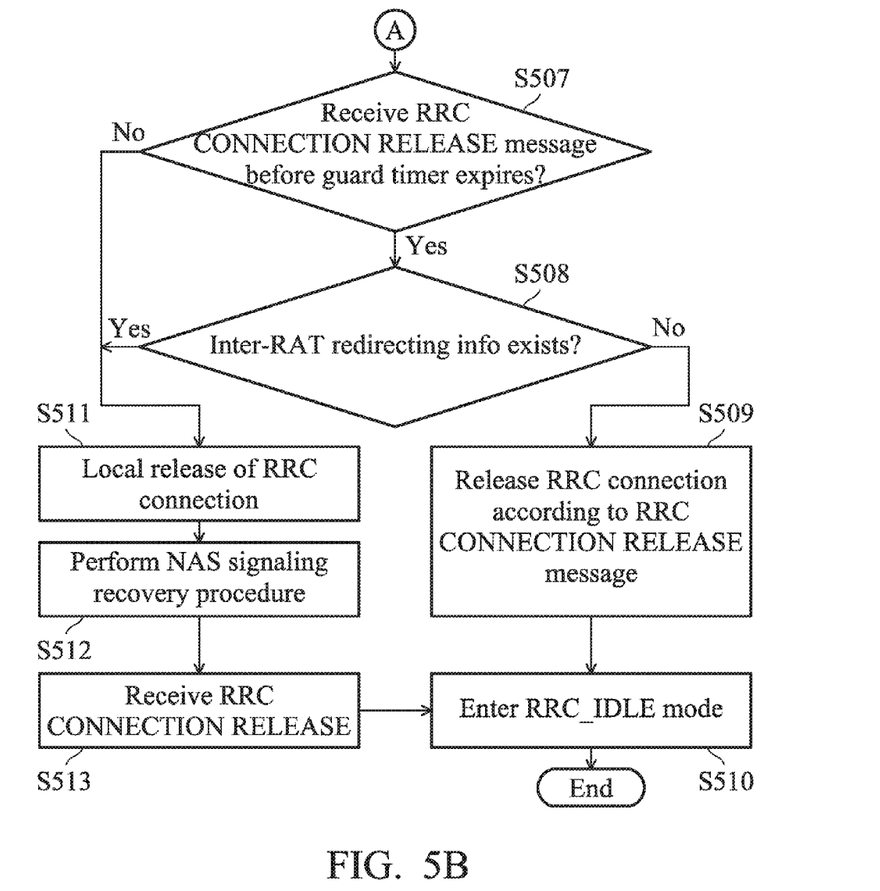

FIGS. 5A and 5B show a flow chart illustrating the method for connection release according to another embodiment of the application. In this embodiment, the method is applied to a mobile communication device, such as the mobile communication device 110, and steps S501~S504 are similar to steps S410~S440 of FIG. 4 and related descriptions are not repeated here for brevity.

Subsequent to step S504, if there is no active data traffic before the watch-dog timer expires, the mobile communication device sends a MEASUREMENT REPORT message to the service network, which includes an event type set to "A2" and indicates a signal quality of a serving cell being less than the lowest threshold previously configured by the service network (step S505). Upon sending the MEASUREMENT REPORT message, the mobile communication device starts a guard timer to count a predetermined period of time (step S506).

Next, the mobile communication device determines whether an RRC CONNECTION RELEASE message is received from the service network before the guard timer expires (step S507), and if so, determines whether the RRC CONNECTION RELEASE message includes an Inter-RAT redirection information IE (step S508). If the Inter-RAT redirection information IE does not exist, the mobile communication device releases the RRC connection, established radio bearers, and all radio resources according to the RRC CONNECTION RELEASE message (step S509), and then enters the RRC_IDLE mode (step S510). Otherwise, if the Inter-RAT redirection information IE exists, the method flow proceeds to step S511.

Subsequent to step S507, if no RRC CONNECTION RELEASE message is received from the service network before the guard timer expires, the mobile communication device performs local release of the RRC connection (step S511) and NAS signaling recovery procedure (step S512). After that, the mobile communication device receives an RRC CONNECTION RELEASE message from the service network (step S513), and then the method flow goes to step S510. It is noted that steps S511 to S513 are similar to steps S450 to S470 of FIG. 4 and related descriptions are not repeated here for brevity.

In view of the forgoing embodiment of FIGS. 4, 5A, and 5B, it will be appreciated that the present application realizes UE-initiated connection release which advantageously saves power of the UE and improves radio resource utilization of the service network by enabling the UE to early transition from the connected mode to the idle mode.

Figure 6A:
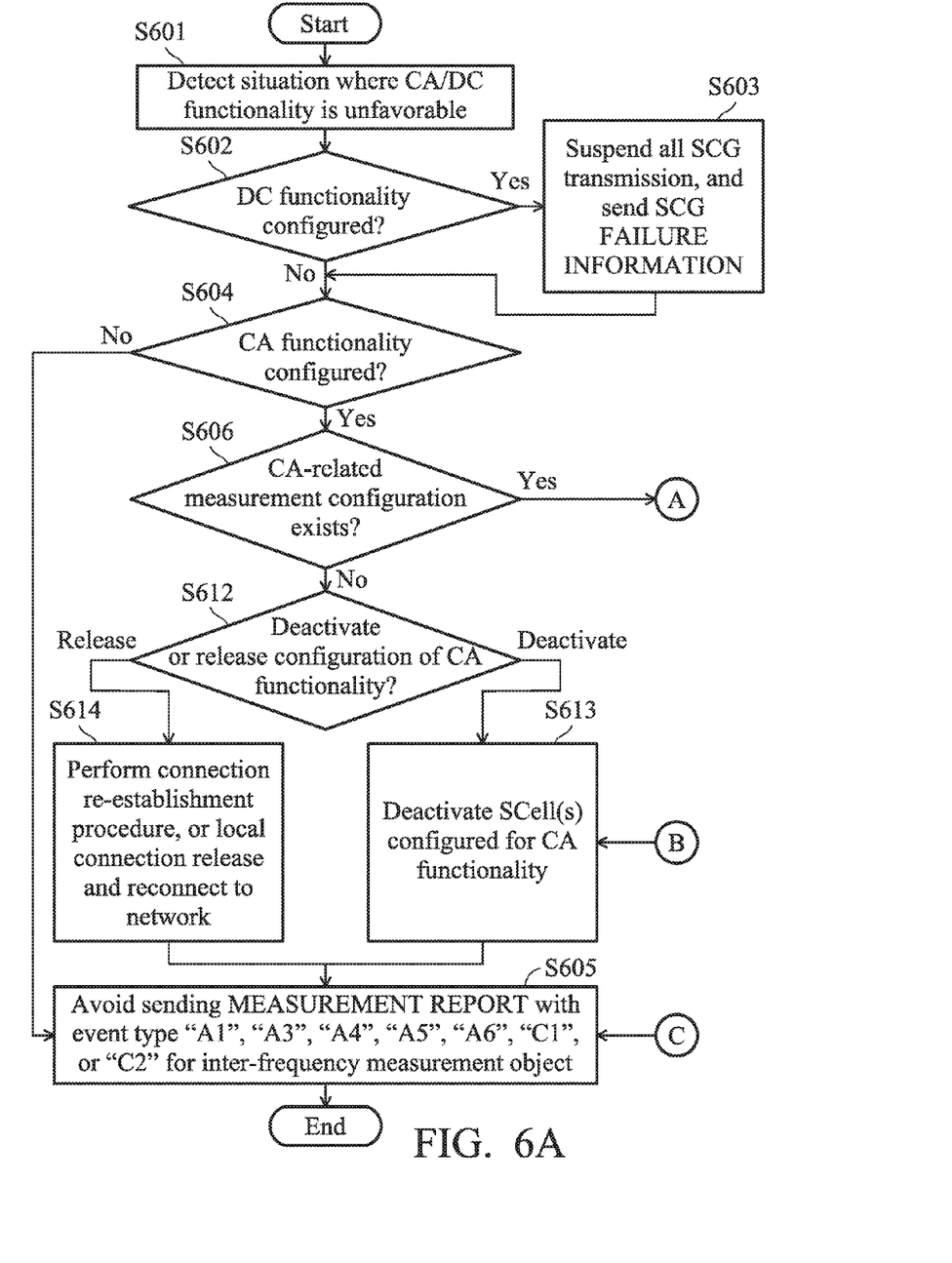
FIGS. 6A and 6B show a flow chart illustrating the method for resource release according to an embodiment of the application.
Figure 6B:
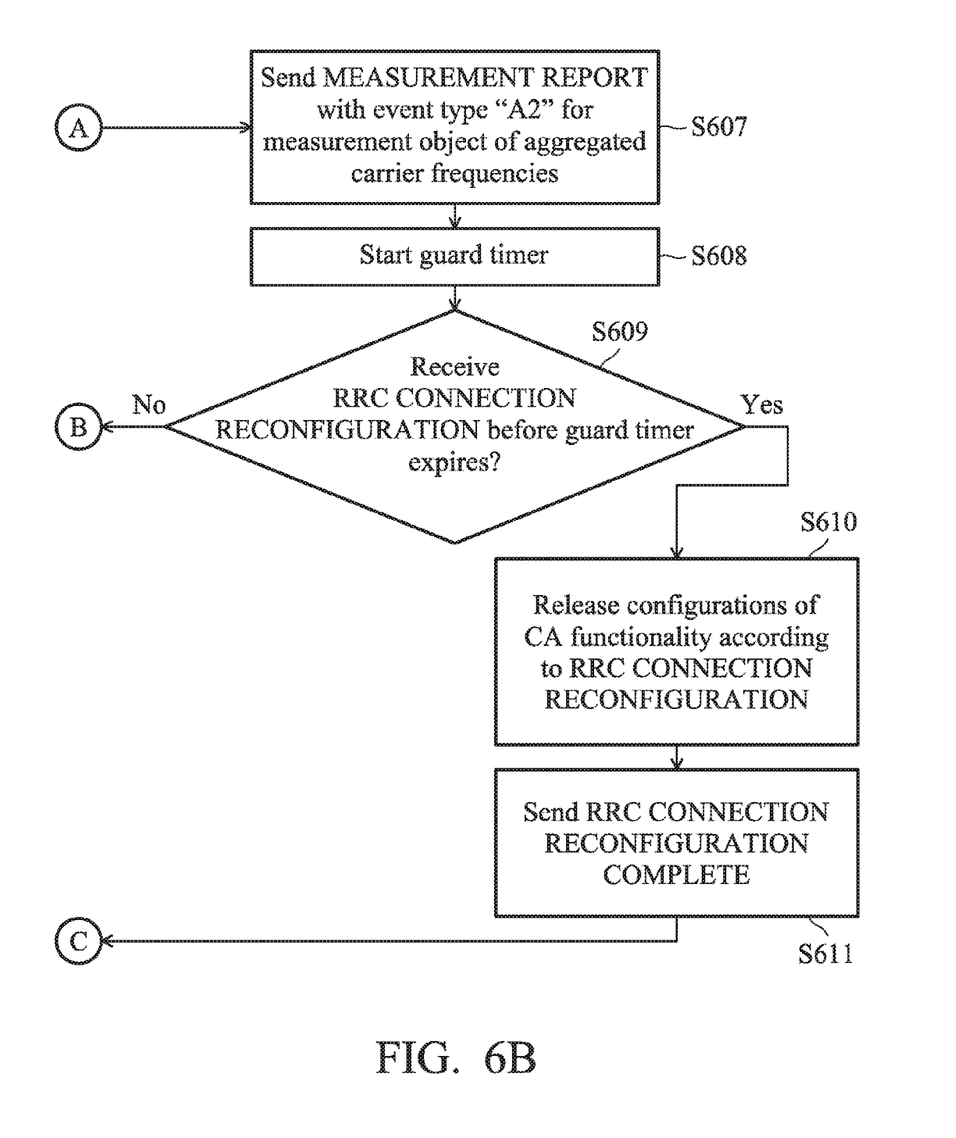

FIGS. 6A and 6B show a flow chart illustrating the method for resource release according to an embodiment of the application. In this embodiment, the method is applied to a mobile communication device, such as the mobile communication device 110, which supports the CA or DC functionality. To begin, the mobile communication device detects a situation where configuration of the CA or DC functionality is unfavorable (step S601). For example, the battery volume of the mobile communication device is too low (e.g., lower than a predetermined threshold), or the operating temperature of the mobile communication device is too high (e.g., higher than a predetermined threshold), or the hardware resource (e.g., the wireless transceiver) of the mobile communication device is shared by operations associated with different subscriber identity cards.

Next, the mobile communication device determines whether the DC functionality is configured (step S602), and if so, releases or deactivates the configuration of the DC functionality by following the 3GPP TS 36.331 specification to suspend all Secondary Cell Group (SCG) transmission on the SCG configured for the DC functionality, and then sends a SCG FAILURE INFORMATION message to the service network (step S603).

Subsequent to steps S602 (if the DC functionality is not configured) and S603, the mobile communication device determines whether the CA functionality is configured (step S604). If the CA functionality is not configured, the mobile communication device avoids sending a MEASUREMENT REPORT message to the service network, which includes an event type set to "A1", "A3", "A4", "A5", "A6", "C1", or "C2" for inter-frequency measurement object(s) (step S605). That is, the MEASUREMENT REPORT message does not include an event type for serving-frequency measurement object(s).

Subsequent to step S604, if the CA functionality is configured, the mobile communication device determines whether measurement configuration related to the CA functionality exists (step S606). If measurement configuration related to the CA functionality exists, the mobile communication device sends a MEASUREMENT REPORT message to the service network, which includes an event type set to "A2" for the measurement object of the aggregated carrier frequency/frequencies and indicates a signal quality of an Secondary Cell (SCell) being less than the lowest threshold previously configured by the service network (step S607), and starts a guard timer upon sending the MEASUREMENT REPORT message (step S608). After that, the mobile communication device determines whether a RRC CONNECTION RECONFIGURATION message is received from the service network before the guard timer expires (step S609), and if so, releases the configurations of the CA functionality according to the RRC CONNECTION RECONFIGURATION message (step S610), sends a RRC CONNECTION RECONFIGURATION COMPLETE message to the service network (step S611), and the method flow goes to step S605.

In another embodiment, the mobile communication device may store, per eNB, the history of whether the MEASUREMENT REPORT message with event type "A2" can trigger the eNB to release the configurations of the CA functionality, and the method flow subsequent to step S606 can be directed to step S612 if it is determined, based on the history information, that the current eNB cannot be triggered to release the configurations of the CA functionality by the MEASUREMENT REPORT message with event type "A2".

Subsequent to step S606, if measurement configuration related to the CA functionality does not exist, the mobile communication device determines whether to deactivate or release the configuration of the CA functionality (step S612). If it is determined that the option of deactivation is to be applied, the mobile communication device directly deactivates the SCell(s) configured for the CA functionality (step S613). In one embodiment, the mobile communication device may act as if the Scell deactivation timer has expired, so as to deactivate the SCell(s). In another embodiment, the mobile communication device may act as if a Deactivation MAC Control Element (CE) has been received, so as to deactivate the SCell(s). Otherwise, if it is determined that the option of release is to be applied, the mobile communication device performs a connection re-establishment procedure with the service network, or performs a local release of the connection and reconnects to the service network (step S614). Subsequent to steps 613 and 614, the method flow goes to step S605. In one embodiment, the determination of whether to apply the option of deactivation or release is an implementation issue, and may be dynamically configured by implementation preference or dynamically configured according the Public Land Mobile Network (PLMN) ID(s) broadcast by the service network.

Upon triggering the connection re-establishment procedure, the mobile communication device will release all established radio bearers for the CA functionality. Specifically, during the connection re-establishment procedure, the mobile communication device sends an RRC CONNECTION REESTABLISHMENT REQUEST message to the service network, and receives an RRC CONNECTION REESTABLISHMENT message from the service network. After that, the service network will re-establishes the radio bearers and radio resource of the Primary cell (PCell) after sending an RRC CONNECTION RECONFIGURATION message to the mobile communication device.

In view of the forgoing embodiment of FIGS. 6A and 6B, it will be appreciated that the present application UE-initiated resource release which allows the UE to release partial radio resources. Advantageously, the UE may choose to use less radio resources under certain situations (e.g., low battery volume or high operating temperature of the UE, or hardware resource of the UE being shared by different subscriber identity cards) where the CA and/or DC functionality is not preferred. For example, the UE may be used for a longer time even when the battery volume is low, or the operating temperature of the UE may be under control, or the operations associated with one subscriber identity card may not hold back the operations associated with another subscriber identity card.

While the application has been described by way of example and in terms of preferred embodiment, it is to be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A mobile communication device, comprising:
a wireless transceiver, configured to perform wireless transmission and reception to and from a service network; and
a controller, configured to operate in a connected mode with a connection to the service network, determine whether there is any active data traffic in a first period of time when operating in the connected mode, and perform a local release of the connection or send a measurement report to trigger the service network to release the connection, in response to determining that there is no active data traffic in the first period of time; wherein the controller is further configured to wait for a connection release command from the service network in a second period of time after sending the measurement report, release the connection according to the connection release command when receiving the connection release command in the second period of time, and perform the local release of the connection when not receiving the connection release command in the second period of time.

2. The mobile communication device of claim 1, wherein, after the local release of the connection, the controller is further configured to perform a Non-Access Stratum (NAS) signaling recovery procedure with the service network by sending a TRACKING AREA UPDATE REQUEST message comprising an active flag indicating "no bearer establishment requested".

3. The mobile communication device of claim 1, wherein the measurement report comprises an event type set to "A2" and indicates a signal quality of a serving cell being less than a lowest threshold.

4. A method for connection release, which is executed by a mobile communication device, the method comprising:
operating in a connected mode with a connection to a service network;
determining whether there is any active data traffic in a first period of time when operated in the connected mode;
performing a local release of the connection or send a measurement report to trigger the service network to release the connection, in response to determining that there is no active data traffic in the first period of time;
waiting for a connection release command from the service network in a second period of time after sending the measurement report;
releasing the connection according to the connection release command when receiving the connection release command in the second period of time; and
performing the local release of the connection when not receiving the connection release command in the second period of time.

5. The method of claim 4, further comprising:
after the local release of the connection, performing a Non-Access Stratum (NAS) signaling recovery procedure with the service network, by sending a TRACKING AREA UPDATE REQUEST message comprising an active flag indicating "no bearer establishment requested".

6. The method of claim 4, wherein the measurement report comprises an event type set to "A2" and indicates a signal quality of a serving cell being less than a lowest threshold.

7. A mobile communication device, comprising:
a wireless transceiver, configured to perform wireless transmission and reception to and from a service network; and
a controller, configured to determine whether a Carrier Aggregation (CA) or Dual Connectivity (DC) functionality has been configured by the service network, and in response to the CA or DC functionality being configured by the service network, locally release or locally deactivate the configuration of the CA or DC functionality;
wherein the deactivation of the configuration of the CA or DC functionality comprises: deactivating a secondary cell configured for the CA or DC functionality, and when the DC functionality has been configured by the service network, releasing a Secondary Cell Group (SCG) configured for the DC functionality and sending a SCG FAILURE INFORMATION message to the service network.

8. The mobile communication device of claim 7, wherein the controller is further configured to determine whether a battery volume of the mobile communication device is lower than a predetermined threshold, and the locally releasing or locally deactivating of the configuration of the CA or DC functionality is performed in response to the battery volume of the mobile communication device being lower than the predetermined threshold.

9. The mobile communication device of claim 7, wherein the controller is further configured to determine whether an operating temperature of the mobile communication device is higher than a predetermined threshold, and the locally releasing or locally deactivating of the configuration of the CA or DC functionality is performed in response to the operating temperature of the mobile communication device being higher than the predetermined threshold.

10. The mobile communication device of claim 7, wherein the controller is further configured to determine whether a hardware resource of the mobile communication device is shared by an operation associated with different subscriber identity cards, and the locally releasing or locally deactivating of the configuration of the CA or DC functionality is performed in response to the hardware resource of the mobile communication device being shared by the operation associated with different subscriber identity cards.

11. A method for resource release, which is executed by a mobile communication device, the method comprising:
determining whether a Carrier Aggregation (CA) or Dual Connectivity (DC) functionality has been configured by the service network; and
in response to the CA or DC functionality being configured by the service network, locally releasing or locally deactivating the configuration of the CA or DC functionality;
wherein the deactivation of the configuration of the CA or DC functionality comprises: deactivating a secondary cell configured for the CA or DC functionality, and when the DC functionality has been configured by the service network, releasing a Secondary Cell Group (SCG) configured for the DC functionality and sending a SCG FAILURE INFORMATION message to the service network.

12. The method of claim 11, further comprising:

determining whether a battery volume of the mobile communication device is lower than a predetermined threshold;

wherein the locally releasing or locally deactivating of the configuration of the CA or DC functionality is performed in response to the battery volume of the mobile communication device being lower than the predetermined threshold.

13. The method of claim 11, further comprising:

determining whether an operating temperature of the mobile communication device is higher than a predetermined threshold;

wherein the locally releasing or locally deactivating of the configuration of the CA or DC functionality is performed in response to the operating temperature of the mobile communication device being higher than the predetermined threshold.

14. The method of claim 11, further comprising:

determining whether a hardware resource of the mobile communication device is shared by an operation associated with different subscriber identity cards;

wherein the locally releasing or locally deactivating of the configuration of the CA or DC functionality is performed in response to the hardware resource of the mobile communication device being shared by the operation associated with different subscriber identity cards.

* * * * *